United States Patent [19]

Poeppelmeier et al.

[11] 4,388,294
[45] Jun. 14, 1983

[54] OXYGEN DEFICIENT MANGANESE PEROVSKITES

[75] Inventors: Kenneth R. Poeppelmeier, Edison; John M. Longo, New Providence, both of N.J.

[73] Assignee: Exxon Research and Engineering Co., Florham Park, N.J.

[21] Appl. No.: 288,996

[22] Filed: Jul. 31, 1981

[51] Int. Cl.$^3$ .............................................. C01G 45/12
[52] U.S. Cl. .................................................. 423/599
[58] Field of Search ......................................... 423/599

[56] References Cited

U.S. PATENT DOCUMENTS 4,049,790  9/1977  Horowitz et al. .................. 423/599

OTHER PUBLICATIONS

Bochu et al., "Journal of Solid State Chem.", vol. 11, 1974, pp. 88-93.
Mellor, "Comprehensive Treatise on Inorg. and Theor. Chemistry", vol. 12, 1932, pp. 277-278, Longmans, Green & Co., N.Y.
MacChesmy et al., "Physical Review", vol. 164, 1967, pp. 784-785.
Toussaint, "Revue de Chimie minerale", vol. 1, 1964, pp. 141-195.

*Primary Examiner*—Herbert T. Carter
*Attorney, Agent, or Firm*—Edward M. Corcoran

[57] ABSTRACT

Oxygen deficient manganese compounds of the formula $CaMnO_{2.5}$ and $Ca_2MnO_{3.5}$ have been prepared by the relatively low temperature reduction of precursors having the formula $CaMnO_3$ and $Ca_2MnO_4$, respectively. These compounds have a perovskite-type structure and are useful in processes requiring solid oxidizing agents, such as oxidative dehydrogenation processes.

14 Claims, 1 Drawing Figure

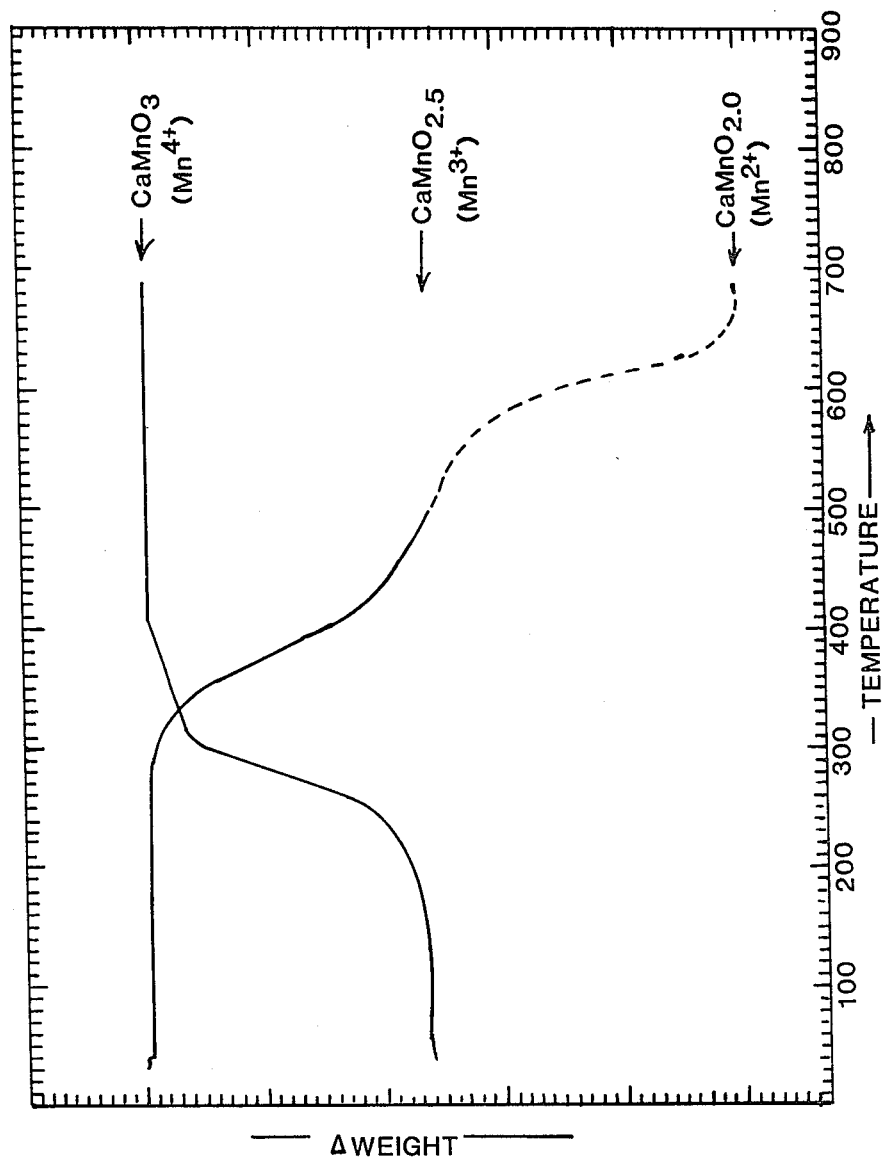

OXYGEN DEFICIENT MANGANESE PEROVSKITES

BACKGROUND OF THE INVENTION

1. Field of the Invention

Oxygen deficient manganese compounds of the formula $CaMnO_{2.5}$ and $Ca_2MnO_{3.5}$ and having a structure related to perovskites. More particularly, oxygen deficient manganese compounds having a perovskite-type structure and of the formula $CaMnO_{2.5}$ and $Ca_2MnO_{3.5}$ have been prepared by the relatively low temperature reduction of precursors of the formula $CaMnO_3$ and $Ca_2MnO_4$, respectively.

2. Background of the Disclosure

The term perovskite refers to a large group of compounds related by composition and structure to the mineral calcium titanate ($CaTiO_3$). A survey of these materials has been compiled by Goodenough and Longo in an article titled "Crystallographic and Magnetic Properties of Perovskite and Perovskite Related Compounds", published in the Landolt-Bornstein Series Group III, v. 4a (1970). There are a large number of stoichiometric perovskite compounds having the general formula $ABX_3$ wherein A is a large Group IA or IIA cation such as Ba, Sr, Ca or Cs capable of close packing with anions X from Group VI or VIIA such as O, S, Cl and Br in the ratio of one cation to three anions and where B is a smaller cation including transition metals such as Ti, V, Mn and Co capable of fitting the anion octahedra formed by the $AX_3$ close packed layers. In addition to these, however, some have been found to exhibit nonstoichiometry on one or more sublattices.

In general, the synthesis of nonstoichiometric compounds from, and having a crystal structure closely related to, a stoichiometric precursor depends on the structure of the precursor starting material. This is because the structure has a large influence on reactivity of the precursor. Examples of such nonstoichiometric compounds include intercalation compounds of graphite and other layered compounds, cation exchangeable layer silicates and the oxide shear phases of Group VB and VIB transition metals. Synthesis of materials of this kind, which depend on existing structural elements in the starting material, often result in metastable compounds and are usually found only at low temperatures. However, anion-deficient $ABO_{3-x}$ perovskites have traditionally been prepared by reducing the oxidized $ABO_3$ phase at high (i.e., $\geq 1,000°$ C.) temperatures. Thus, compounds which are metastable or stable only at lower temperatures are lost.

A considerable amount of work has been done in synthesizing and studying various compounds containing calcium, manganese and oxygen. Among these are U.S. Pat. No. 4,060,500 which discloses a process for preparing high surface area mixed metal oxides by decomposing solid solutions of carbonates possessing the calcite structure. This patent discloses, for example, that $CaMnO_3$ with a surface area of 11 $m^2/g$ useful as a battery cathode can be formed by decomposing a $CaMn(CO_3)_2$ precursor. U.S. Pat. No. 4,049,790 discloses the preparation of a low temperature, layered manganese compound of the formula $Ca_2Mn_3O_8$ by calcining certain solid solutions of mixed calcium and manganese carbonates having a calcite structure. U.S. Pat. No. 4,101,716 discloses the preparation of other high surface area, mixed metal oxides of manganese and calcium which are useful in electrochemical processes. Finally, in an article titled "Phase Relations in the Ca-Mn-O System", in Mat. Res. Bull. v. 13p. 1359–1369 (1978), Longo and Horowitz published an article disclosing what was then the state of the art for both actual and proposed phase diagrams for the Ca-Mn-O system. These phase diagrams represent all that is known or was known about this system until the instant invention.

SUMMARY OF THE INVENTION

What has now been discovered are new and novel oxygen deficient manganese compounds of the formula $CaMnO_{2.5}$ and $Ca_2MnO_{3.5}$ having perovskite-type structures which have been prepared by the relatively low temperature reduction of precursors having the formula $CaMnO_3$ and $Ca_2MnO_4$ respectively. The reduction temperature will be within the range of from about 300°–500° C. with the actual temperature depending on the particular reducing agent or atmosphere used. At temperatures above about 600° C. these new compounds are thermally unstable and will decompose into a mixture of calcium oxide (CaO) and calcium manganese oxide ($CaMn_2O_4$). When the precursors are reduced to the compounds of this invention, they lose up to one-sixth of their oxygen without undergoing structural rearrangement or decomposition into separate phases. If the compounds of this invention are contacted with a suitable oxidizing agent such as air, they reversibly revert back to their respective precursor. This oxidation-reduction cycle may be repeated indefinitely without destruction of the perovskite lattice structure. Thus, the compounds of this invention are useful in processes requiring regenerable, solid oxidizing agents, such as oxidative dehydrogenation.

BRIEF DESCRIPTION OF THE DRAWINGS

The FIGURE is a TGA trace of a reversible redox cycle of $CaMnO_3/CaMnO_{2.5}$ followed by an irreversible reduction to $CaMnO_2$.

DETAILED DESCRIPTION

The $CaMnO_3$ and $Ca_2MnO_4$ starting materials used as the precursors of the novel compositions of this invention may be prepared by any convenient means known to those skilled in the art. For the investigations and experiments disclosed herein, they were obtained from their respective calcite precursors, $CaMn(CO_3)_2$ and $Ca_2Mn(CO_3)_3$ using the technique disclosed in U.S. Pat. No. 4,060,500. In this technique, the calcites are oxidatively decomposed in air at 1000° C. in a Lindberg furnace over a period of 3 hours, after which unreacted carbonate can not be detected in either powder x-ray diffraction patterns or infrared spectra of the $CaMnO_3$ and $Ca_2MnO_4$ products. It should be noted that all the x-ray diffraction patterns herein referred to were determined from data recorded with a Philips diffractometer using $CuK\alpha$ radiation and a graphite crystal diffracted-beam monochromator. The spectra were recorded at a scan-rate of 0.25°/min. The reduction of $CaMnO_3$ and $Ca_2MnO_4$ was studied over a temperature range of from about room temperature to 600° C. in mixtures of helium with hydrogen, $NH_3$, and hydrocarbons which were supplied premixed by Matheson Gas Company.

The reductions of $CaMnO_3$ and $Ca_2MnO_4$ with the hydrogen/helium mixture were possible only within the relatively narrow temperature range of from about 300°–325° C. and long reactions times in excess of 100 hrs. were required for these reactions (1 and 2 below) to go to completion. Below 300° C., the hydrogen reductions occurred at an extremely slow rate and even after 100 hours in a Lindberg furnace little or no reduction of the precursor and formation of the compounds of this invention were observed.

$$2\ CaMnO_3(s) + H_2(g) \rightarrow 2CaMnO_{2.5}(s) + H_2O(g) \quad [1]$$

$$2\ CaMnO_4(s) + H_2(g) \rightarrow 2Ca_2MnO_{3.5}(s) + H_2O(g) \quad [2]$$

When the precursors were reduced by contact with a suitable hydrocarbon reducing atmosphere or agent such as a mixture of ethylene, propylene, toluene, 1-butene, etc., diluted with helium, the compounds of this invention were produced within the temperature range of from about 400°–500° C., said reductions occurring in substantially less time (i.e., from about 3 to 5 hours) than with hydrogen. The reactions with a gas such as propylene, were as set forth below.

$$18\ CaMnO_3(s) + C_3H_6(g) \rightarrow 18CaMnO_{2.5}(s) + 3CO_2(g) + 3H_2O(g) \quad [3]$$

$$18\ Ca_2MnO_4(s) + C_3H_6(g) \rightarrow 18\ Ca_2MnO_{3.5}(s) + 3CO_2(g) + 2H_2O(g) \quad [4]$$

These reactions were complete after three hours at 475° C. in a 5%/95% mixture of propylene/helium. Actually, reactions [3] and [4] are over simplified inasmuch as the propylene was oxidatively dehydrogenated to produce 1,5-hexadiene in an amount of 20 mole % of the propylene consumed in the reactions.

The precursors were also reduced to the compounds of this invention in only 3 to 5 hours when the reducing agent was NH$_3$ diluted with helium, according to the following equations:

$$6\ CaMnO_3 + 2\ NH_3 \rightarrow 6\ CaMnO_{2.5} + N_2 + 3\ H_2O \quad [5]$$

$$6\ Ca_2MnO_4 + 2\ NH_3 \rightarrow 6\ Ca_2MnO_{3.5} + N_2 + 3\ H_2O \quad [6]$$

These reductions occur within the temperature range of 400°–500° C.

Thus, it can be seen that suitable reducing agents useful for forming the compositions of this invention include inorganic reducing agents such as H$_2$ and NH$_3$ as well as organic reducing agents. Illustrative, but non-limiting examples of suitable organic reducing agents include allylic hydrogen compounds such as propylene, benzylic hydrogen compounds such as toluene and vinylic hydrogen compounds such as ethylene. The choice of reducing agent is left to the convenience of the practitioner, although organic reducing agents are preferred.

The CaMnO$_{2.5}$ and Ca$_2$MnO$_{3.5}$ compounds of this invention are thermally unstable above temperatures of about 600° C. and will decompose via the metathetical reactions set forth below.

$$2CaMnO_{2.5}(s) \rightarrow CaO(s) + CaMn_2O_4(s) \quad [7]$$

$$2Ca_2MnO_{3.5}(s) \rightarrow 3CaO(s) + CaMn_2O_4(s) \quad [8]$$

It should be noted that reactions 7 and 8 are enhanced by the presence of carbon dioxide, because the CaO reacts with CO$_2$ in a very exothermic acid-base reaction to form CaCO$_3$. This decomposition is more severe at higher temperatures. The greater mole fraction of basic calcium oxide relative to manganese oxide present in Ca$_2$MnO$_{3.5}$ versus CaMnO$_{2.5}$ makes the formation of carbonate more favorable for Ca$_2$MnO$_{3.5}$ than for CaMnO$_{2.5}$.

The cation stoichiometries of the CaMnO$_3$ and Ca$_2$MnO$_4$ precursors prepared from their respective calcite (carbonate) precursors were determined by reducing the oxide in hydrogen for 2 hours at 1000° C. The lattice parameters of the reduced phases with the rock-salt structure are linearly dependent on the Ca/Mn ratio and, therefore, these parameters give a precise and accurate method for determining cation stoichiometries. The oxygen content of the oxidized and reduced compositions were established by hydrogen reduction using a Fisher Thermogravimatric Analyzer equipped with a Cahn electro-balance. The experimentally determined compositions were within 1 atomic percent of the theoretical value of CaMnO$_3$, CaMnO$_{2.5}$, Ca$_2$MnO$_4$ and Ca$_2$MnO$_{3.5}$.

As has heretofore been stated, a significant property of the oxygen deficient manganese perovskite compounds of this invention is their ease of reoxidation with complete restoration to their initial composition without any change in structure merely by exposure to an oxygencontaining atmosphere suchg as air. This reoxidation is very rapid in air at temperatures as low as 300° C. Further, the cycle of reduction and reoxidation can be repeated for an indefinite number of times without chemical or physical degradation of the perovskite structure. The Figure, which is discussed in Example 5, is a TGA trace of one reversible redox cycle of CaMnO$_3$/CaMnO$_{2.5}$ followed by an irreversible reduction to CaMnO$_2$. It should be noted that as many as ten reversible redox cycles have been accomplished with the compounds of this invention without any loss of crystal structure.

Tables I and II list all the observed x-ray diffraction data for CaMnO$_{2.5}$ and Ca$_2$MnO$_{3.5}$, respectively, over the angular range of $10° < 2\theta < 45°$. The diffraction peaks in both patterns can be indexed on the basis of similar distortions of the simple cubic 3.7Å distance characteristic of the Mn-O-Mn array of the oxidized precursors. The structural relationship can be expressed by the equation $(a_o + b_o/2)/2 + a_c\sqrt{2}$. In this equation $a_o$ and $b_o$ are the new orthorhombic lattice parameters which are related by the equality shown to the pseudo-cubic quantity $a_c$, which is about 3.7 Å. From these data the unit cell for CaMnO$_{2.5}$ was determined to be orthorhombic with a = 5.43 (1) Å, b = 10.24(1) Å, and c = 3.74 (1) Å and for CaMnO$_{3.5}$ to be, again orthorhombic with a = 5.30 (1) Å, b = 10.05 (1) Å, and c = 12.24 (1) Å. High resolution Guinier films obtained with monochromatized CuK$\alpha$, radiation with an Enraf-Nonius Model FR-522 camera were consistent with the orthorhombic unit cells used to index the diffractometer data. All observed intensity data were consistent with a model based on the original perovskite-type structure of the oxidized precursors with only small atom displacements which result from the anion vacancies introduced into the lattice by reduction.

TABLE I

| Powder X-ray Diffraction Data for CaMnO$_{2.5}$ | | |
|---|---|---|
| hkl | d (Å) | I (observed) |
| 020 | 5.121 | 0.4 |
| 110 | 4.799 | 0.7 |
| 001 | 3.742 | } 19.0 |
| 120 | 3.726 | |

TABLE I-continued

Powder X-ray Diffraction Data for CaMnO$_{2.5}$

| hkl | d (Å) | I (observed) |
|---|---|---|
| 021 | 3.021 | 0.2 |
| 111 | 2.951 | 1.0 |
| 130 | 2.891 | 1.9 |
| 200 | 2.716 | 25.5 |
| 121 | 2.640 | } 100.0 |
| 210 | 2.625 | |
| 040 | 2.560 | 28.8 |
| 220 | 2.399 | 0.5 |
| 140 | 2.316 | 6.7 |
| 131 | 2.288 | 12.0 |
| 201 | 2.198 | 0.7 |
| 211 | 2.149 | 4.4 |
| 230 | 2.125 | } 9.6 |
| 041 | 2.113 | |
| 221 | 2.020 | 0.5 |
| 141 | 1.969 | 0.2 |
| 150 | 1.917 | 0.1 |

TABLE II

Powder X-ray Diffraction Data for Ca$_2$MnO$_{3.5}$

| hkl | d (Å) | I (observed) |
|---|---|---|
| 002 | 6.120 | 26.4 |
| 020 | 5.025 | — |
| 111 | 4.381 | 1.3 |
| 022 | 3.884 | 0.9 |
| 121 | 3.496 | 7.7 |
| 113 | 3.079 | } 2.5 |
| 004 | 3.060 | |
| 131 | 2.760 | 1.2 |
| 123 | 2.720 | 100.0 |
| 200 | 2.653 | 45.0 |
| 024 | 2.614 | 1.0 |
| 210 | 2.565 | 0.9 |
| 040 | 2.513 | 47.0 |
| 202 | 2.434 | — |
| 212 | 2.365 | } 3.3 |
| 220 | 2.346 | |
| 133 | 2.327 | } 9.7 |
| 042 | 2.324 | |
| 141 | 2.233 | 0.4 |
| 222 | 2.190 | — |
| 115 | 2.170 | — |
| 230 | 2.080 | 3.8 |
| 006 | 2.040 | } 44.9 |
| 125 | 2.033 | |
| 204 | 2.004 | } 2.0 |
| 143 | 1.984 | |
| 232 | 1.969 | } 2.3 |
| 214 | 1.966 | |

EXAMPLE 1

In this experiment, a number of runs were made with 7.00 gram samples of CaMnO$_3$ which were placed in an alumina boat which was then inserted into the quartz tube of a Lindberg furnace. The reducing atmosphere in the furnace was a flowing mixture of 10% hydrogen in helium. The runs were carried out at temperatures of from 250°–400° C. in 25° C. increments. Reduction of the CaMnO$_3$ to pure product was achieved after 72 hours at temperatures of from 300°–325° C. X-ray diffraction analysis showed that the product at these temperatures was CaMnO$_{2.5}$ and not a mixture of CaO and CaMn$_2$O$_4$.

EXAMPLE 2

This experiment was similar to that of Example 1 except that the precursor placed in the alumina boat was 6.14 gram samples of Ca$_2$MnO$_4$. The reducing atmosphere was 10% hydrogen in helium and the reduction was studied over temperatures of from 250°–400° C. Complete reduction occurred after 135 hours at temperatures of 300°–325° C. and x-ray diffraction showed that most of the product was Ca$_2$MnO$_{3.5}$. Although no CaO or CaMn$_2$O$_4$ could be detected in the product, small amounts (i.e. less than 5 mole %) of Ca$_2$MnO$_3$ was detected.

EXAMPLE 3

This experiment was similar to those of Examples 1 and 2, except that the reducing atmosphere in the Lindberg furnace was a mixture of 5% propylene in helium. The reduction of both the CaMnO$_3$ (3.22 g samples) and Ca$_2$MnO$_4$ (5.00 g samples) precursors was studied over a temperature range of from 300°–600° C. Complete reduction of each precursor was achieved in just three hours at temperatures of from 450° to 500° C. X-ray diffraction analysis of the products showed them to be the same for each precursor as was achieved in Examples 1 and 2 in the hydrogen/helium reducing atmosphere.

EXAMPLE 4

This experiment demonstrates reduction of the precursor to the composition of this invention in a reducing atmosphere consisting of about 6% NH$_3$ in helium. Five gram samples of the CaMnO$_3$ precursor were employed and the reductions were studied over a temperature range of from 300° to 500° C. Complete reduction was achieved at from 425°–475° C. after three hours, with x-ray diffraction analysis showing the product to be CaMnO$_{2.5}$.

EXAMPLE 5

In this experiment, the CaMnO$_3$ precursor was heated from room temperature up to 500° C. in a mixture of 10% hydrogen in helium in a Fischer Thermogravimetric Analyzer (TGA) equipped with a Cahn electrobalance. X-ray analysis of the reduction product revealed it to be CaMnO$_{2.5}$. The TGA data showed that the CaMnO$_3$ precursor lost 0.25 moles of oxygen (O$_2$) per mole of Mn$^{3+}$. The so-formed CaMnO$_{2.5}$ was then oxidized in the TGA unit by heating from room temperature to 500° C. X-ray analysis of the oxidation product showed it to be CaMnO$_3$ and the TGA data revealed that 0.25 moles of oxygen (O$_2$) per mole of Mn$^{3+}$ were consumed during the oxidation. The Figure is a TGA trace of one such cycle along with an irreversible reduction of the CaMnO$_{2.5}$ to CaMnO$_2$ as the temperature exceeds 600° C. As has been stated previously, ten reversible redox cycles were done with the CaMnO$_3$/CaMnO$_{2.5}$ system without loss of crystal structure. Similar experiments were done with the Ca$_2$MnO$_4$/Ca$_2$MnO$_{3.5}$ system.

What is claimed is:

1. An oxygen deficient manganese compound of the composition Ca$_2$MnO$_{3.5}$ having a perovskite-type structure.

2. An oxygen deficient manganese compound of the composition CaMnO$_{2.5}$ having a perovskite-type structure.

3. An oxygen deficient, manganese compound of the composition $CaMnO_{2.5}$ having an orthorhombic, perovskite type structure wherein said structure has the approximate lattice parameters of $a=5.43$ Å, $b=10.24$ Å and $c=3.74$ Å.

4. An oxygen deficient manganese compound of the composition $Ca_2MnO_{3.5}$ having an orthorhombic, perovskite type structure wherein said structure has the approximate lattice parameters of $a=5.30$ Å, $b=10.05$ Å and $c=12.24$ Å.

5. A process for preparing an oxygen deficient, manganese compound having a perovskite-type structure and the formula $CaMnO_{2.5}$ comprising contacting $CaMnO_3$ with a suitable reducing agent at a temperature of from between about 300°–600° C.

6. The process of claim 5 wherein said reducing agent comprises a hydrocarbon.

7. The process of claim 6 wherein said reducing temperature ranges between about 400°–500° C.

8. The process of claim 7 wherein said reducing agent comprises an allylic, benzylic or vinylic hydrogen hydrocarbon.

9. A process for producing an oxygen deficient, manganese compound of the formula $Ca_2MnO_{3.5}$ and having a perovskite-type structure which comprises contacting $Ca_2MnO_4$ with a suitable reducing agent at a temperature ranging from about 300°–600° C.

10. The process of claim 9 wherein said reducing agent comprises a hydrocarbon.

11. The process of claim 10 wherein said reducing temperature ranges between about 400°–500° C.

12. The process of claim 9 wherein said reducing agent comprises an allylic, benzylic or vinylic hydrogen hydrocarbon.

13. A process for producing $CaMnO_3$ comprising oxidizing $CaMnO_{2.5}$ in an oxidizing atmosphere at elevated temperature.

14. A process for producing $Ca_2MnO_4$ comprising oxidizing $Ca_2MnO_{3.5}$ in an oxidizing atmosphere at elevated temperature.

* * * * *